United States Patent (10) Patent No.: US 6,639,914 B1
Choi et al. (45) Date of Patent: Oct. 28, 2003

(54) ANALOG TRANSLATOR FOR IEEE 1394 AND TRANSLATING METHOD THEREOF

(75) Inventors: Ki-young Choi, Anyang (KR); Jung-ho Song, Osan (KR)

(73) Assignee: Samsung Electronics Co, Ltd., Kyungki-do (KR)

( * ) Notice: Subject to any disclaimer, the term of this patent is extended or adjusted under 35 U.S.C. 154(b) by 0 days.

(21) Appl. No.: 09/419,907

(22) Filed: Oct. 18, 1999

(30) Foreign Application Priority Data

Oct. 16, 1998 (KR) ............................................ 98-43356

(51) Int. Cl.⁷ .......................... H04L 12/40; G06F 13/00
(52) U.S. Cl. ....................... 370/389; 370/463; 370/465; 370/469; 710/11; 710/69; 710/305
(58) Field of Search ................................. 370/389, 392, 370/401, 402, 463, 465, 466, 467, 469; 709/220, 221, 223; 710/8, 11, 62, 65, 69, 104, 105, 305, 306, 315

(56) References Cited

U.S. PATENT DOCUMENTS

| 5,875,313 | A | * | 2/1999 | Sescila, III et al. | ......... | 395/309 |
| 5,937,175 | A | * | 8/1999 | Sescila, III et al. | ......... | 395/309 |
| 5,953,511 | A | | 9/1999 | Sescila, III et al. | ......... | 395/309 |
| 5,991,842 | A | * | 11/1999 | Takayama | ..................... | 710/105 |
| 6,061,794 | A | * | 5/2000 | Angelo et al. | ............... | 713/200 |
| 6,138,196 | A | * | 10/2000 | Takayama et al. | ........... | 710/105 |
| 6,219,697 | B1 | * | 4/2001 | Lawande et al. | ............ | 709/221 |

FOREIGN PATENT DOCUMENTS

| JP | 10-145420 | 5/1998 |
| JP | 10-149668 | 6/1998 |
| JP | 10-178438 | 6/1998 |
| JP | 10-271146 | 10/1998 |

OTHER PUBLICATIONS

International Search Report.

\* cited by examiner

*Primary Examiner*—Alpus H. Hsu
(74) *Attorney, Agent, or Firm*—Sughrue Mion, PLLC

(57) ABSTRACT

An analog translator for the IEEE 1394 serial bus by which it is possible to use an analog device as a part of a home network when the analog device is connected to the IEEE 1394 serial bus and a translating method thereof are provided. The analog translator includes a plurality of ports to which analog devices are connected, a status register for showing which analog devices are connected, a configuration ROM for storing the information on the connected analog devices, a controller for setting the corresponding bit of a status register assigned to an analog device, reading the bit status of the set status register, and recording connection information of the analog device to the configuration ROM which refer to the bit status of the status register, when an analog device is connected to the port, a 1394 interfacing unit for receiving a packet data from the IEEE 1394 bus, checking whether the packet data corresponds to the node thereof, and disintegrating packet data and thus removing a header from the packet data when the packet data corresponds to the node thereof, a storing unit for storing payload data removed of a header from the 1394 interface, a destination unit extractor for decoding the payload data of the storing unit and extracting information on the destination analog device of the payload data, and a data translating unit for translating the payload data removed of the information on the destination analog device into analog signal. According to the present invention, it is possible to interface both analog and digital devices in realizing an IEEE 1394 home network.

8 Claims, 2 Drawing Sheets

ANALOG TRANSLATOR FOR IEEE 1394 AND TRANSLATING METHOD THEREOF

BACKGROUND OF THE INVENTION

1. Field of the Invention

The present invention relates to IEEE 1394 data translation, and more particularly, to an analog translator for the IEEE 1394 bus by which it is possible to use analog devices when such analog devices are connected to the IEEE 1394 bus and a translating method thereof.

2. Description of the Related Art

Recently, various digital devices such as digital TVS (DTVs), digital video cameras (DVCs), digital video disk players (DVDPs), and digital set-top boxes are increasingly being used. The IEEE 1394 serial bus is specifically used as an interface for the above devices. It is to be noted that, for interfacing a device using the IEEE 1394 bus, the device is required to be a digital device. However, a substantial number of audio/video devices currently used in the home are analog devices. These analog devices, therefore, are incompatible with the IEEE 1394 serial bus that forms a key component of home networks. Therefore, to be compatible with IEEE 1394, such analog audio/video devices must be replaced by digital audio/video devices. To avoid such a replacement, an analog translator for the IEEE 1394 is required.

SUMMARY OF THE INVENTION

To solve the above problem, it is an object of the present invention to provide an analog translator for the IEEE 1394 bus for interfacing analog devices such as TVS, camcorders, and VCRs with the IEEE 1394 bus based on a digital interface in order to allow the analog devices to operate as a part of home networks.

It is another object of the present invention to provide an analog translating method for the IEEE 1394 bus.

Accordingly, to achieve the first object, An analog translator for the IEEE 1394 serial bus, comprising: a plurality of ports, wherein a plurality of analog devices can be connected to said ports, a status register for indicating which subset of said plurality of analog devices are connected to said ports, wherein each of said plurality of analog devices is assigned to a separate bit in the status register, a configuration ROM for storing information related to said subset of the plurality of analog devices that are connected, a controller for setting bits of the status register to designate status of the subset of analog devices that are connected, reading the status of the set status register, and recording on the configuration ROM a connection information of the subset of the analog devices that are connected, wherein said configuration ROM refers to the bit status of the status register, when an analog device is connected to the port, a 1394 interfacing unit for receiving a packet data from the IEEE 1394 bus, checking whether the packet data corresponds to a node thereof, and disintegrating packet data and removing a header from the packet data when the packet data corresponds to the node thereof, a storing unit for storing a payload data removed from the header, a destination unit extractor for decoding the payload data and extracting a destination information corresponding to the payload data, and a data translating unit for translating the extracted destination information into an analog signal.

The 1394 interfacing unit comprises a physical layer for receiving a packet data from the IEEE 1394 bus and a link layer for checking whether the received packet data is the data corresponding to the node thereof and disintegrating the packet data, removing a header from the packet data, and detecting error when the received packet data is the data corresponding to the node thereof.

To achieve the second object, there is provided an analog translating method for the IEEE 1394 bus, comprising the steps of checking which subset of a plurality of analog devices are connected, recording information on the subset of the plurality of analog devices that are connected, initializing the IEEE 1394 bus after plugging a translator in the IEEE 1394 bus, determining whether a request to transmit 1394 bus data has been received, analyzing a packet header of a packet data when said request to transmit data has been received and checking whether the packet data is a data corresponding to the node connected to the translator, separating the payload data into a destination unit information and a pure payload data and extracting the destination unit information, translating the pure payload and transmitting the translated payload data to a destination unit corresponding to the extracted destination unit information.

BRIEF DESCRIPTION OF THE DRAWING(S)

The above objects and advantages of the present invention will become more apparent by describing in detail a preferred embodiment thereof with reference to the attached drawings in which.

DESCRIPTION OF THE PREFERRED EMBODIMENTS

Figure 1:
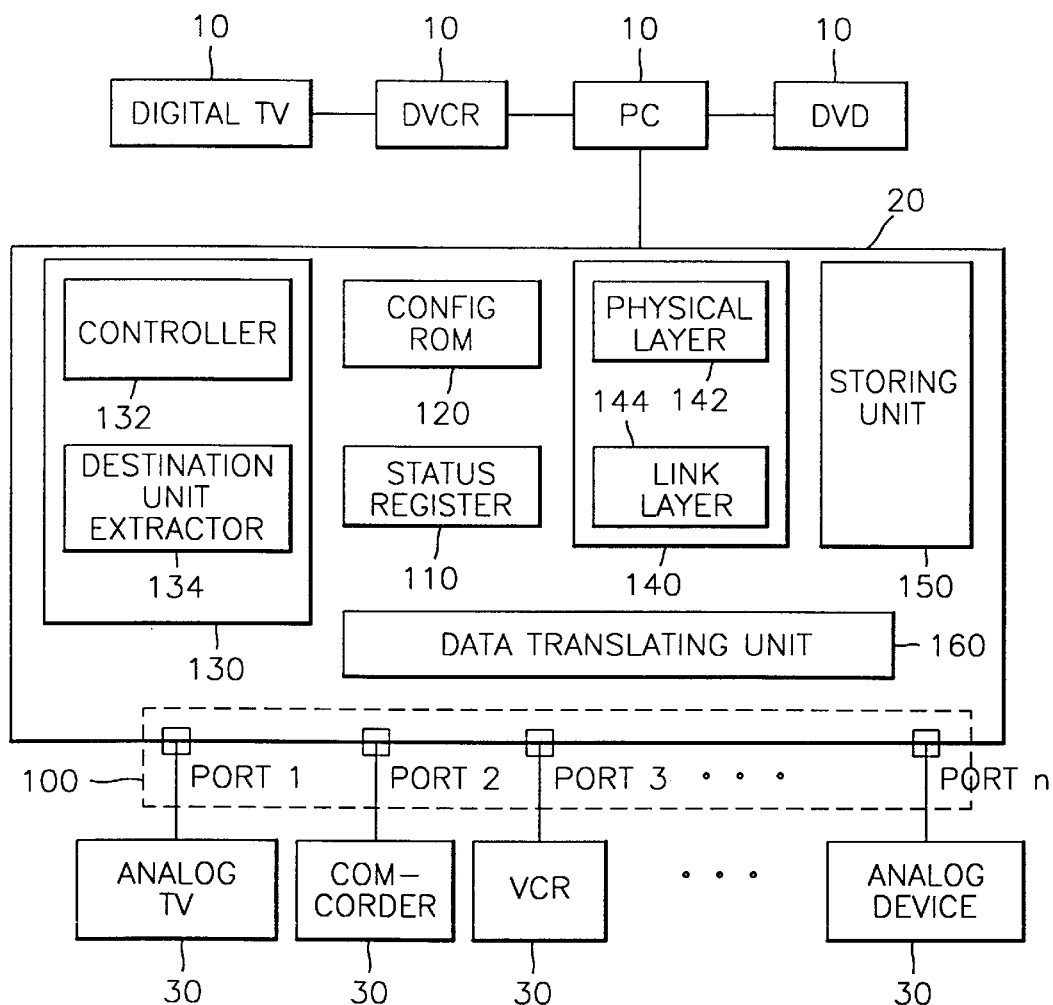
FIG. 1 shows the structure of an IEEE 1394 network including a translator according to the present invention.

FIG. 1 shows the structure of the IEEE 1394 network including a translator according to the present invention. The IEEE 1394 network consists of nodes 10 connected by the IEEE 1394 bus, a translator 20, and analog devices 30 connected to the translator.

The translator 20 connected to the analog devices 30 receives transmitted data from the nodes 10 through the IEEE 1394 bus, translates the transmitted data into an analog signal, and sends the analog signal to a corresponding analog device.

The translator 20 is comprised of a plurality of ports 100, a status register 110, a configuration ROM 120, a microcomputer 130, a 1394 interfacing unit 140, a storing unit 150, and a data translating unit 160.

The analog devices 30 are connected to the plurality of ports 100.

Figure 2:
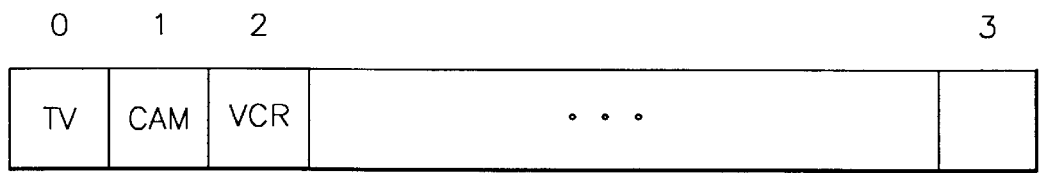
FIG. 2 shows an example of a status register.

In the status register 110, a plurality of bits indicate whether the analog devices 30 are actually connected to the plurality of ports 100. Each bit of the status register is assigned to a separate analog device. Therefore, when an analog device is connected to a port, a bit corresponding to that analog device is set. FIG. 2 shows an example of a status register of 32 bits. Bits 0, 1, and 2 are respectively assigned to a TV set, a camcorder, and a VCR.

The configuration ROM 120 stores information on the names of the analog devices that can be connected and whether the analog devices are actually connected. More preferably, information on the connection status of units and information on the respective units are stored in a root directory region and a unit directory region of configuration ROM 120 respectively. The root and unit directory regions are specified by a general ROM format in section 8 of the IEEE 1394 specification. The units correspond to analog devices.

The microcomputer 130 consists of a controller 132 and a destination unit extractor 134. The controller 132 sets the corresponding bit of the status register 110 assigned to the analog device. Further, it reads the set status register, and records information on the status of connection of the analog devices on the configuration ROM 120. The destination unit extractor 134 decodes payload data stored in the storing unit 150 and extracts the information about the destination analog device related to the payload data.

The 1394 interfacing unit 140 has a physical layer 142 and a link layer 144. The physical layer 142 receives data bit stream from the IEEE 1394 bus. The link layer 144 checks whether the received data bit stream corresponds to the node of the translator. When the received data bit stream corresponds to the node of the translator, the link layer 144 disintegrates the packet, removes the header, and detects errors.

The storing unit 150 stores payload data output from the 1394 interfacing unit 140. Preferably, the storing unit 150 adopts a first-in/first-out (FIFO) structure.

The data translating unit 160 translates pure payload data into analog data. It is to be noted that the pure payload data comprises payload data from which information on the destination analog device has been removed.

According to the IEEE 1394-1995 standard specification, all nodes on the IEEE 1394 bus undergo bus resetting and initialization processes and tree and self-identifying processes where the unique IDs of nodes are determined whenever devices are plugged in and detached from the nodes. A root node is determined in the tree identifying process. IDs of the respective nodes are dynamically determined in the self-identifying process. The root node and node IDs determined as above are upgraded whenever the bus is reset.

However, analog devices do not have a plug & play function. Therefore, the translator must sense that an analog device is connected to the port in order to identify which analog devices are connected thereto. To do this, it is possible that when an analog device is connected to the port, the port number of the connected analog device is set by an external button. In this case, the set port number and the analog device must be previously mapped and fixed. For example, fixed mapping information between the port and the device such that the port 1 is connected to a TV set and that the port 2 is connected to a camcorder is stored in the configuration ROM 120. When an analog device is connected to a port of the translator and the external button is turned on, a certain level of current flows thereto. Then, the current level is checked and the level value is stored in the status register 110. Then, the microcomputer 130 reads the level value, identifies which analog device corresponds to the level value with reference to the configuration ROM 120, and records the status of the connection. Thus, the translator identifies which analog devices are connected thereto.

A node that is designated to transmit data to the analog device connected to the translator accesses the translator 20 and reads the configuration ROM 120. The translator operates as a node connected to the IEEE 1394 bus and is connected to a plurality of analog devices. The analog devices connected to the translator are designated as units. The information of the units is stored in a unit directory region. The node transmits data that is formatted into formats suitable for the respective analog devices. The formatting is based on the information related to the units. The detailed structure of root and unit directories corresponds to the structure specified by the standard IEEE 1212. Key values of the directory are not defined yet. These key values are left to the user. Definitions of the key values of such a directory are provided in an upper software region. The translator analyzes the transmitted data block, enables the corresponding path of a device specified in the data, and transmits data through the path.

The analog device connected to the translator cannot perform arbitration for requesting the transmission of data. Only a node can perform arbitration. The analog device merely receives data transmitted from the IEEE 1394 node through the translator. The IEEE 1394 translator is connected to the IEEE 1394 bus after identifying the analog device connected thereto. At this time, the IEEE 1394 translator can be made into a root node by resetting the IEEE 1394 bus. After the IEEE 1394 translator becomes the root node, the IEEE 1394 bus prevents the bus from being reset even though a new analog device is added or removed, thus not interfering with the data transmission of other devices. However, even in such a case, the IEEE 1394 bus is reset when the translator is plugged in or detached from the IEEE 1394 bus.

Figure 3:
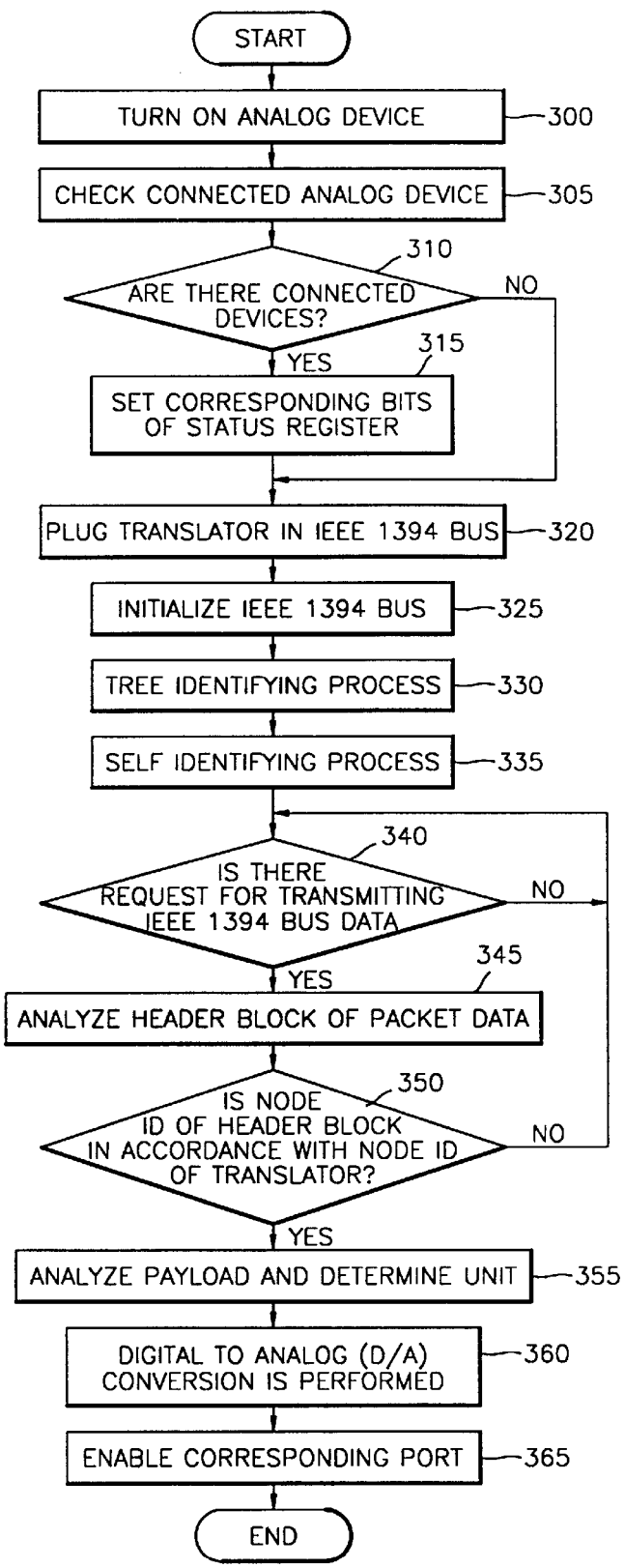
FIG. 3 is a flowchart showing the operation of the IEEE 1394 translator according to the present invention.

FIG. 3 is a flowchart showing the operation of the IEEE 1394 translator according to the present invention. A device to be connected is switched on (step 300) and the analog device is manually connected to the translator. When the analog device is connected, the translator examines the ports connected thereto and checks whether connected devices exist (step 305). If connected analog devices are present (step 310), corresponding port values are stored by setting the corresponding bits of the status register (step 315). The connected device is identified with reference to the stored port value and the configuration ROM. Then, the translator is plugged in the IEEE 1394 bus (step 320). The IEEE 1394 bus is initialized by plugging in the translator (step 325). The translator becomes a root node by a Force_Root command. By becoming a root node, the translator can control the bus. The translator already has information related to the analog device connected thereto when the translator is plugged into the IEEE 1394 bus. When the translator becomes the root node, the translator provides a node ID through a tree identifying process (step 330). It also provides node IDs to the respective nodes of the IEEE 1394 bus through a self-identifying process (step 335).

When an IEEE 1394 node needs to transmit data to the analog device connected to the translator, the node reads the status register in the translator. The IEEE 1394 reads information on the port number from the configuration ROM using the bit status of the status register in order to identify which devices are connected and to determine to which device data is to be transmitted. Such information is stored in the root directory and the unit directory specified in the IEEE 1212 standard. When the packet is transmitted, the destination ID on the IEEE 1394 bus will be an ID of the root node. The translator checks whether there is a request to transmit data (step 340).

If there is request to transmit 1394 bus data, the translator analyzes the packet data (step 345) and checks whether the packet data corresponds to the node ID thereof (step 350). If the node ID of the header block is in accordance with the node ID of the translator, payload data obtained by removing a header from the packet data is stored in the storing unit 150. Then, this payload data is analyzed to determine the destination analog devices to which the data is to be transmitted (step 355). A digital-to-analog (D/A) conversion is then performed. The data is placed in a format suitable for the corresponding device (step 360). When the corresponding port is enabled, the data is transmitted to the analog device (step 365).

According to the present invention, after the translator is plugged into the IEEE 1394 serial bus, the bus is not reset no matter which IEEE 1394 device is added. Thus, the IEEE 1394 serial bus is not reset and the root node is not changed when a new device is added to or removed from the IEEE 1394 serial bus. Only the information of the added node is stored in the memory region and the ID is newly assigned to the information and is used.

Using the techniques and devices of the present invention, it is possible to interface both analog and digital devices in realizing the IEEE 1394 home network.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An analog translator for the IEEE 1394 serial bus, comprising:
    a plurality of ports, wherein a plurality of analog devices can be connected to said ports;
    a status register for indicating which subset of said plurality of analog devices are connected to said ports, wherein each of said plurality of analog devices is assigned to a separate bit in the status register;
    a configuration ROM for storing information related to said subset of the plurality of analog devices that are connected;
    a controller for setting bits of the status register to designate status of the subset of analog devices that are connected, reading the status of the set status register, and recording on the configuration ROM a connection information of the subset of the analog devices that are connected, wherein said configuration ROM refers to the bit status of the status register, when an analog device is connected to the port;
    a 1394 interfacing unit for receiving a packet data from the IEEE 1394 bus, checking whether the packet data corresponds to a node thereof, and disintegrating packet data and removing a header from the packet data when the packet data corresponds to the node thereof;
    a storing unit for storing a payload data removed from the header;
    a destination unit extractor for decoding the payload data and extracting a destination information corresponding to the payload data; and
    a data translating unit for translating the extracted destination information into an analog signal.

2. The translator of claim 1, wherein the 1394 interfacing unit further comprises:
    a physical layer for receiving a packet data from the IEEE 1394 bus; and
    a link layer for checking whether the received packet data is the data corresponding to the node thereof and disintegrating the packet data, removing a header from the packet data, and detecting error in the payload data when the received packet data is the data corresponding to the node thereof.

3. The translator of claim 1, wherein, information on the connection status of analog device units are stored in a root directory region of the configuration ROM.

4. The translator of claim 1, wherein, information on the analog device units are stored in a unit directory region of the configuration ROM.

5. The translator of claim 1, wherein, the storing unit stores data based on a first in first out (FIFO) structure.

6. The translator of claim 1, wherein, when an analog device is connected to one of said plurality of ports, a port number corresponding to the connected analog device is set by an external button.

7. An analog translating method for the IEEE 1394 bus, comprising the steps of:
    (a) checking which subset of a plurality of analog devices are connected;
    (b) recording information on the subset of the plurality of analog devices that are connected;
    (c) initializing the IEEE 1394 bus after plugging a translator in the IEEE 1394 bus;
    (d) determining whether a request to transmit 1394 bus data has been received;
    (e) analyzing a packet header of a packet data when said request to transmit data has been received and checking whether the packet data is a data corresponding to the node connected to the translator;
    (f) separating the payload data into a destination unit information and a pure payload data and extracting the destination unit information;
    (g) translating the pure payload; and
    (h) transmitting the translated payload data to a destination unit corresponding to the extracted destination unit information.

8. The method of claim 7, wherein the step (a) comprises the sub-steps of:
    (i) setting a corresponding bit of the status register assigned to a port to which the analog device is connected, when an analog device is connected; and
    (ii) reading the bit status of the status register, identifying the connected analog device with reference to a configuration ROM where connectable analog devices are mapped to the port numbers, and recording a connection status.

* * * * *